United States Patent [19]
Mayfield

[11] Patent Number: 5,988,402
[45] Date of Patent: Nov. 23, 1999

[54] STAND FOR MOTORCYCLES

[76] Inventor: William Rodgers Mayfield, 1103 Collinwood St., Opelika, Ala. 36801

[21] Appl. No.: 09/032,729

[22] Filed: Feb. 27, 1998

[51] Int. Cl.$^6$ ........................................................ A47F 7/04
[52] U.S. Cl. ............................................ 211/20; 224/42.3
[58] Field of Search ................................ 211/17, 19, 20, 211/21, 22; 248/288.11, 289.11, 292.13, 299.1; 224/42.12, 42.3, 403, 924

[56] References Cited

U.S. PATENT DOCUMENTS

| | | |
|---|---|---|
| 767,553 | 2/1904 | Schebler et al. . |
| 1,116,946 | 6/1914 | Griffin et al. . |
| 3,785,517 | 1/1974 | Brajkovich ............................ 211/22 X |
| 3,788,675 | 1/1974 | Wilander . |
| 3,860,255 | 1/1975 | Rodriguez . |
| 4,015,718 | 4/1977 | Bernard .................................. 211/22 X |
| 4,437,597 | 3/1984 | Doyle ..................................... 211/20 X |
| 5,301,817 | 4/1994 | Merritt ................................... 211/20 X |
| 5,735,410 | 4/1998 | Kallstrom ................................... 211/20 |

Primary Examiner—Daniel P. Stodola
Attorney, Agent, or Firm—Robert J. Veal; Kenneth M. Bush; Veal & Bush, LLC

[57] ABSTRACT

A motorcycle stand uses a novel combination of components including a primary capture mechanism that consists of a transverse rod on which are mounted two vertical capture plates that translate inward as the motorcycle tire enters the stand. The capture plates are mounted for rotation orthogonally to the translation concomitantly with a tire contact plate. Translation of the plates is accomplished by the spring action and location of a pair of compressible pivot rods that have one end mounted forward and outward of the main rotation axis of the tire contact plate and the other end affixed to the sides of the capture plates. Forward rotation of the primary capture mechanism results in inward translation of the capture plates until they contact the tire side-wall. Further rotation results in compression of the springs in each pivot rod. A second, upper engagement shoe cooperates to ensure that the tire is fully captured. Accommodation of wider tires is accomplished by a longer and more compressible pivot rod or by providing a second, outward location for the compressible pivot rod which will allow capture of the widest of motorcycle rear tires.

16 Claims, 4 Drawing Sheets

STAND FOR MOTORCYCLES

FIELD OF THE INVENTION

The present invention relates to motorcycles and accessories for the same. More particularly, the present invention relates to apparatus for maintaining motorcycles in an upright position and in even greater particularity the present invention relates to apparatus which can support a motorcycle in the upright position during transportation of the motorcycle.

BACKGROUND OF THE INVENTION

Because of the inherent instability of the two wheeler, the most fundamental necessity of motorcycling is to keep the machine in an upright position. This is always true whether riding, stopped, in transit, or in storage. At times this can be a particularly difficult task, especially without an additional person to help support the machine. By way of example, significant difficulty is encountered when loading a motorcycle onto a trailer because the motorcycle must be ridden or pushed up a ramp and held in an upright position while securing straps are attached and tightened.

Motorcycles that are used to compete on racetracks cannot have side-stands of any kind attached permanently to the machine. The absence of an attached support, requires the placing of an external stand under the motorcycle by the operator or a second person when the machine comes off the track.

There have been notable attempts to develop a stand that would address some of the issues mentioned above, but all have limitations in their capabilities. One such attempt is found in U.S. Pat. No. 3,785,517; "Motorcycle Carrier and Chock." This stand provides convenient and secure support for some motorcycles, but because of the fixed width and diameter of the supporting channel it will only be applicable for a narrow range of tire sizes. Smaller diameter tires and narrow tires will not be held securely and larger tires will not enter the stand. This is of particular concern today because the trend is moving toward wider and wider tire sizes.

The stand presented in International Application Number PCT/GB96/01276 has greater versatility by providing a wedge shaped receiving shoe and a matching upper shoe both mounted pivotally to allow for different diameter tires. But again, a much wider tire will require a greater effort to engage the shoes and many modem tires will simply not fit.

What is needed is a stand into which the motorcycle can be ridden or pushed that captures the front or rear tire of the motorcycle allowing the operator, without further action, to dismount the bike without worry of it falling over.

SUMMARY OF INVENTION

It is the object of the present invention to provide a stand that will hold a motorcycle in a vertical position while requiring only that the motorcycle be driven or pushed into the stand for engagement.

It is a further object of the invention to provide a stand which can accommodate a plurality of tire sizes in diameter and width with equal ease of engagement and detachment.

A further objective is to provide a stand that will accommodate the full range of motorcycle tire sizes, front or rear.

The further object of the foregoing objects is the improvement in ease and safety for an individual loading a motorcycle on a trailer or convenient vertical support when desired.

These and other objects and advantages of the stand are accomplished in a novel combination of components including a primary capture mechanism that consists of a transverse rod on which are mounted two vertical capture plates that translate inward as the motorcycle tire enters the stand. The capture plates are mounted for rotation orthogonally to the translation concomitantly with a tire contact plate. Translation of the plates is accomplished by the spring action and location of a pair of compressible pivot rods that have one end mounted forward and outward of the main rotation axis of the tire contact plate and the other end affixed to the sides of the capture plates. Forward rotation of the primary capture mechanism results in inward translation of the capture plates until they contact the tire side-wall. Further rotation results in compression of the springs in each pivot rod. A second, upper engagement shoe cooperates to ensure that the tire is fully captured. Accommodation of wider tires is accomplished by a longer and more compressible pivot rod or by providing a second, outward location for the compressible pivot rod which will allow capture of the widest of motorcycle rear tires.

BRIEF DESCRIPTION OF THE DRAWING

Apparatus embodying features of my invention are depicted in the appended drawings which form a portion of this disclosure and wherein.

DESCRIPTION OF THE PREFERRED EMBODIMENT

Figure 1:
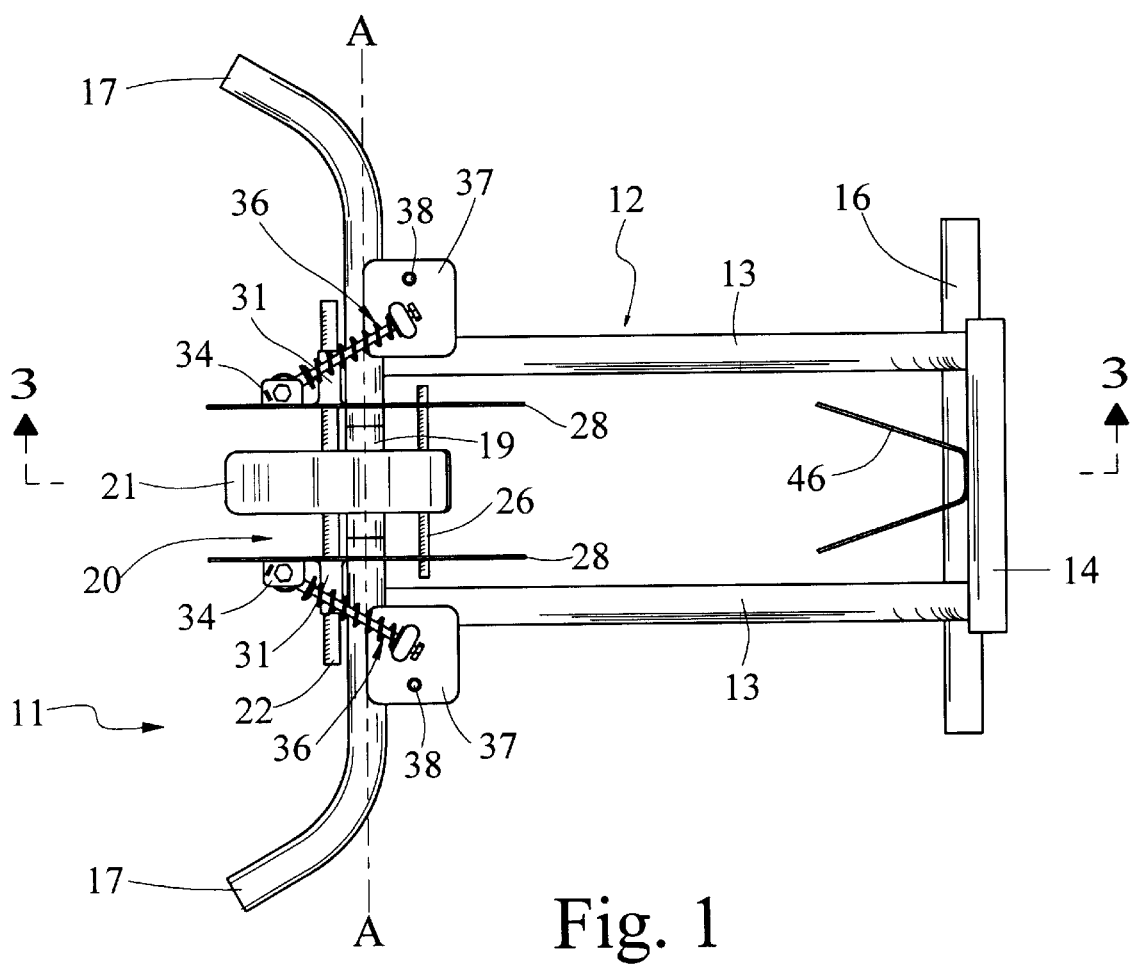
FIG. 1 is a plan view of the motorcycle stand ready to receive a motorcycle tire.
Figure 2:
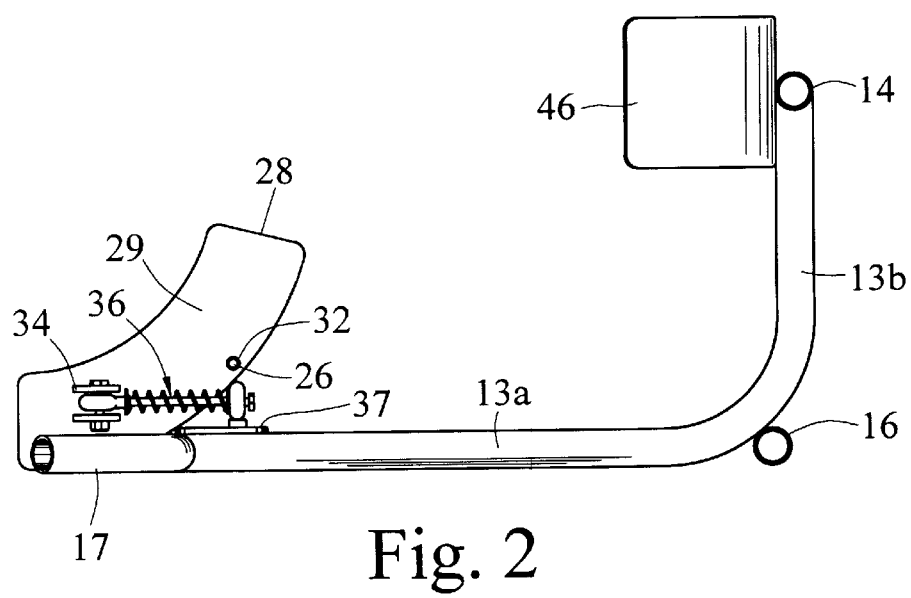
FIG. 2 is an elevational view of the stand.
Figure 3:
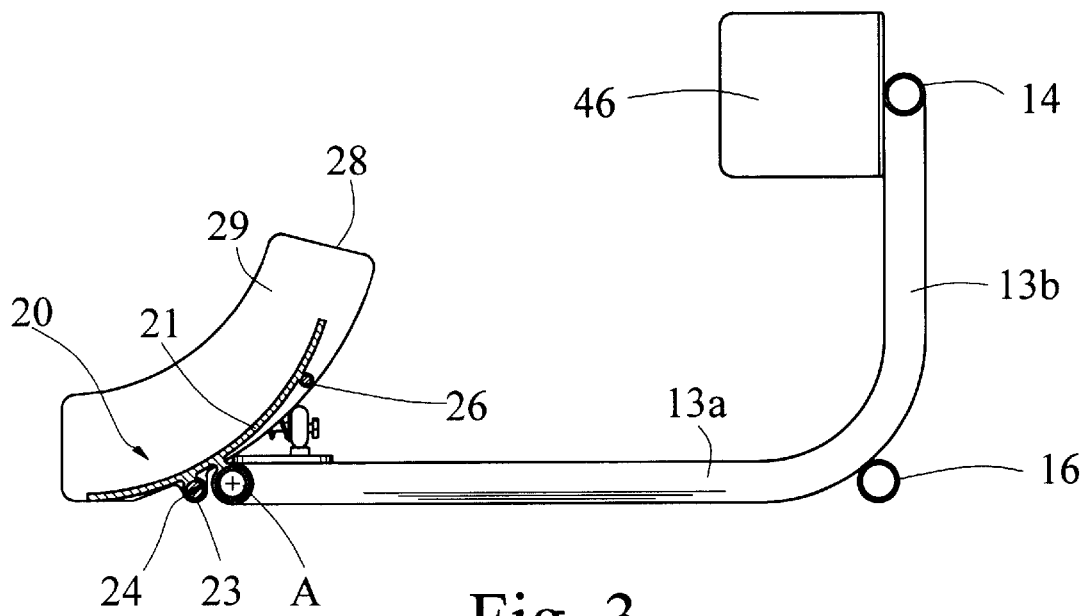
FIG. 3 is a section view along line 3—3 of FIG. 1 showing detail of the tire contact plate, main rotation axis, and the slide and alignment rods.
Figure 4:
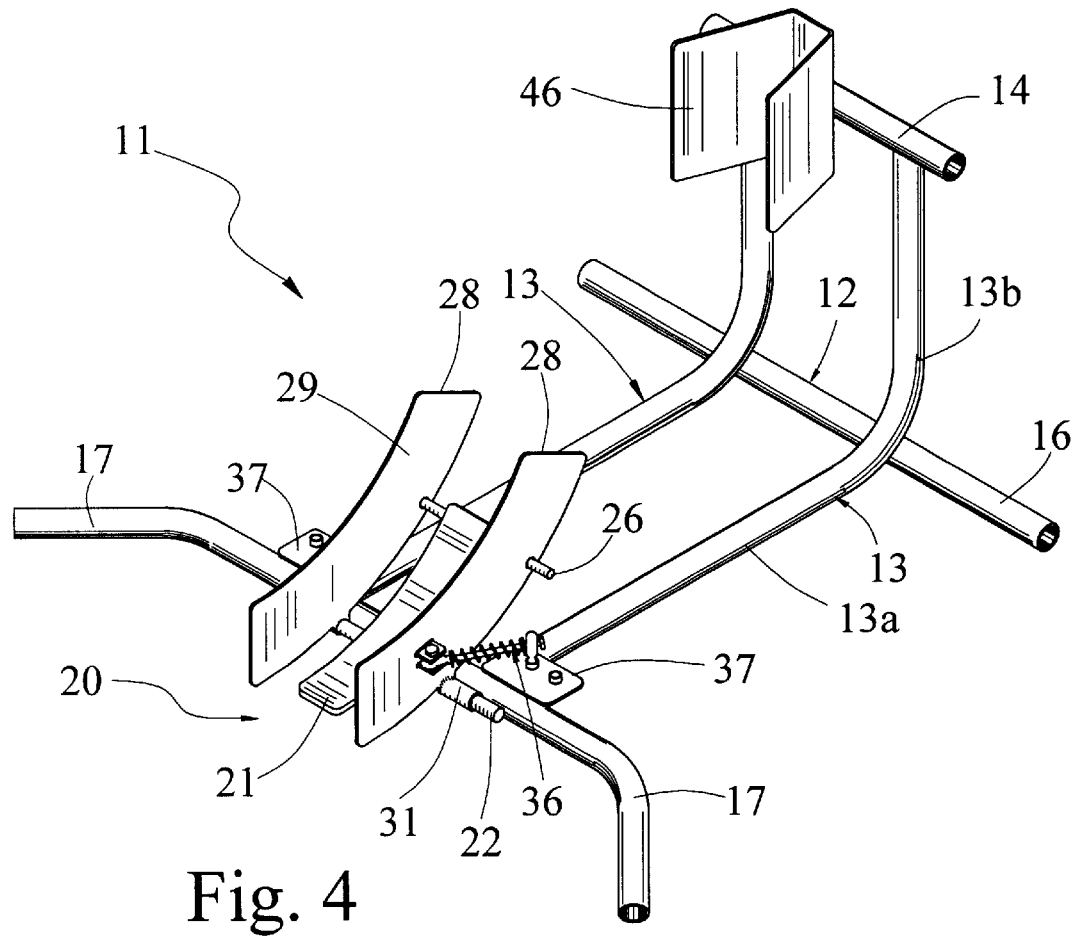
FIG. 4 is a perspective view of the stand in the ready position.

Referring to the FIGS. for a clearer understanding of the invention, it may be seen in FIG. 1, that the invention is a motorcycle stand 11 includes a tubular base 12 defined by a pair of laterally spaced longitudinal tubes 13 having a horizontally disposed portion 13(*a*) and an upturned, vertically extending portion 13(*b*). A terminal tube 14 is affixed to both tubes 13 at the end of upturned portion 13(*b*). A lateral bracing tube 16 is affixed to tubes 13 at the transition from vertical portion 13(*a*) to portion 13(*b*) and extends laterally to provide stability to the base 12. An entry lateral bracing tube 17 is affixed to the ends of tube 13 at the end of horizontal portion 13(*a*) and likewise extends laterally to provide stability to base 11. Entrant tube 17 is provided with a rotating tube section 19, centrally and transversely mounted between tubes 13 and integral with the lower forward portion of tubular base 12. Section 19 is rotatable about its longitudinal axis which defines the main rotation axis (A) indicated in FIGS. 1 and 3. It should be noted that base 12 may alternatively be frame members of a motorcycle trailer; therefore, tube portions 13 and 13(*b*) are merely illustrative.

Connected longitudinally to the pivoting tube section 19, so as to allow pivoting of the lower capture mechanism in the direction of tire travel, is lower capture mechanism 20 including a tire contact plate 21 comprised of a metal plate curved at such a radius as to fairly accommodate the full range of motorcycle tire diameters (approximately 12"). A capture plate slide rod 22 is attached by either welding or via tube 23 and roll pin 24 assembly to the tire contact plate 21 at a position rearward of and parallel with the main rotation axis A. Also attached to this tire contact plate 21 is an alignment rod 26 oriented parallel with and mounted forward of the main rotation axis A and attached by similar means as the capture plate slide rod 22.

Figure 5:
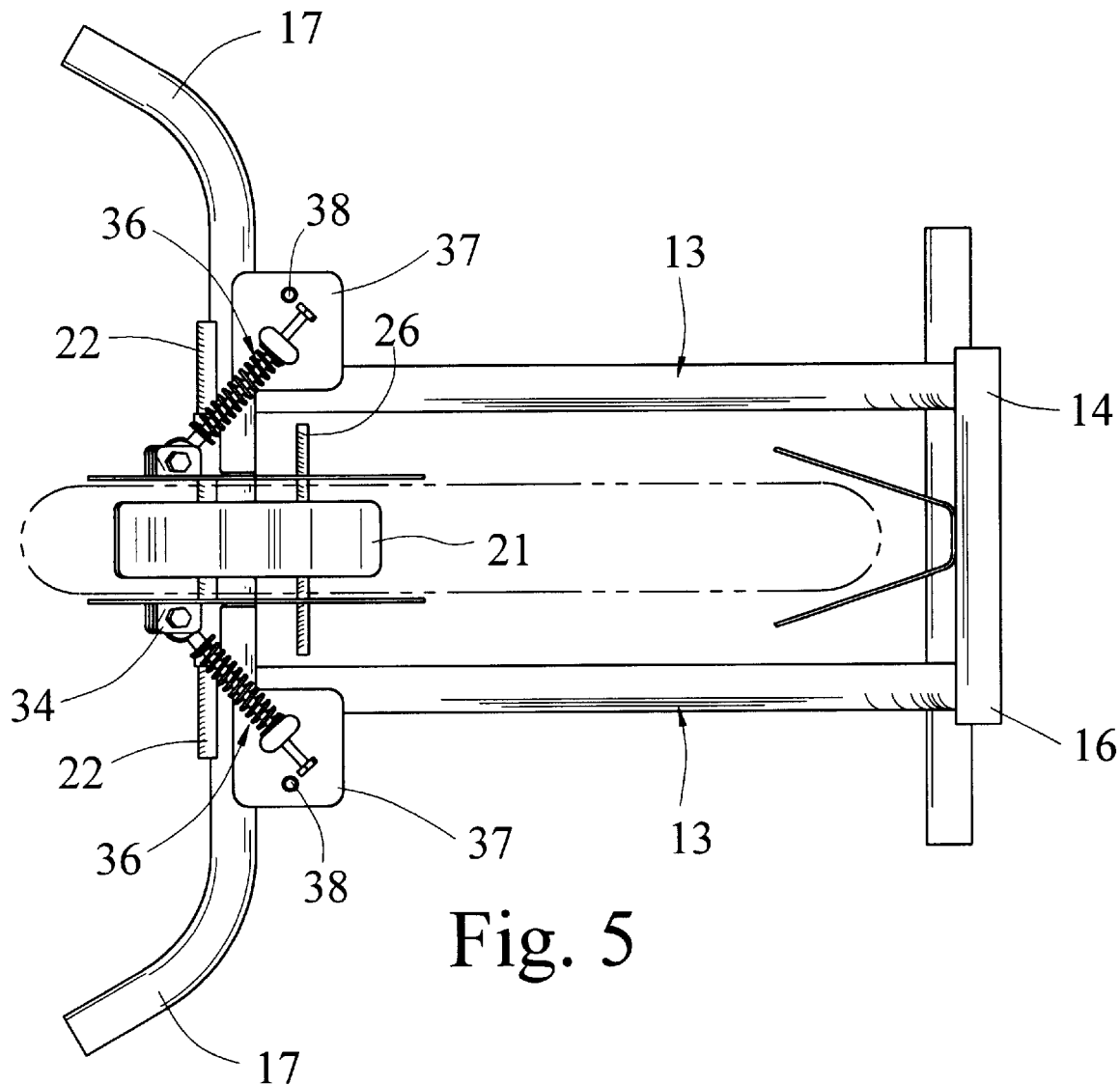
FIG. 5 is a plan view of the stand with a tire in the captured position.
Figure 7:
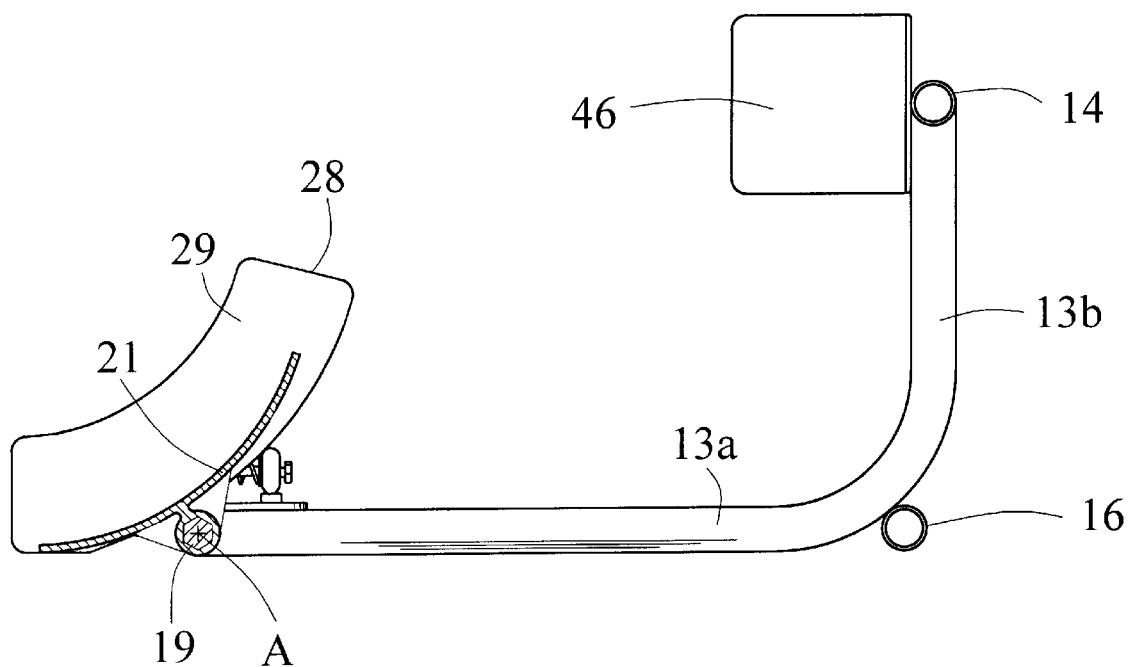

A pair of capture plates 28 are constructed with each having a vertical contact surface 29 oriented longitudinally to the direction of travel and opposing one another. A horizontal tube section 31 is attached perpendicular to the outside of each capture plate 28, circumscribing a first aperture 30. Slide rod 22 is inserted through aperture 30 and tube section 31 such that the capture plates 28 may translate along slide rod 22 and engage the side-wall of a motorcycle tire as shown in FIG. 5. Each capture plate 28 is constructed with a hole 32 through which the alignment rod 26 protrudes, such that translation of the plates on rod 26 is facilitated. The combination of slide rod 22 and alignment rod 26 operates to rotate the capture plates concomitantly with the tire contact plate 21 while allowing translation along the slide rod 22 in the direction of the main rotation axis A. Alternatively, capture plate 28 may have an aperture adapted to receive rotating tube section 19 which may be splined or shaped to effect concomitant rotation of plate 28; thus, eliminating the need for rods 22 and 26. A detail may be seen in FIG. 7.

Figure 6:
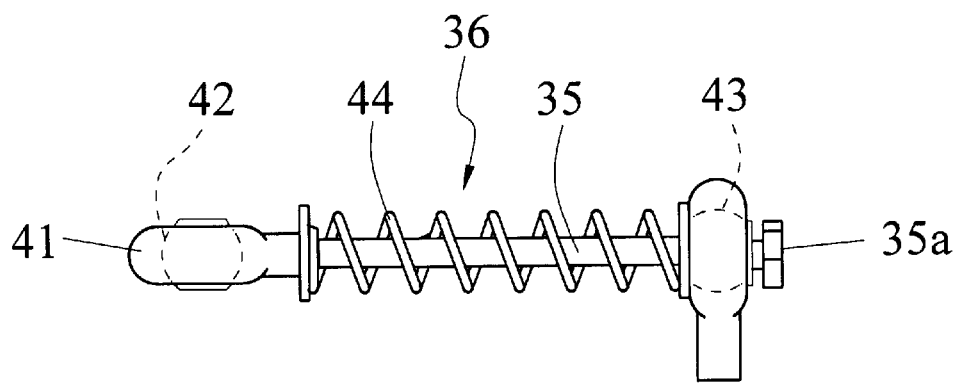
FIG. 6 is a partial elevational view of a detail of the compressible pivot rod assembly; and, FIG. 7 is a sectional detail of an alternative embodiment.

Attached to a clevis 34 on each capture plate 28 is a pivot rod 36 with the other end of said rod mounted on a pivot rod location pad 37 forward and outward of the main rotation axis A. The pivot rod location pad may be constructed such that it provides adjustment location holes 38 to accommodate wider tires. The pivot rod 36 is constructed so as to be a compressible link between the pivot rod location pad 37 and the capture plates 28. This rod as now contemplated and shown in FIG. 6 is constructed using a bolt 35 having a rod end 41 having a spherical bearing 42 captured in clevis 34 with an opposite end 35(a) extending through a spherical bearing 43 mounted to pad 37. Coaxial spring 44 captured between rod end 41 and bearing 43 that provides the necessary compressibility. Other means of compression (gas shock, translatable pivot rod mounting plate) are contemplated.

Operation of the stand is shown in FIG. 5. A tire enters the stand and makes contact with the tire contact plate 21, forcing the entire primary capture assembly to rotate forward about the main rotation axis A. The pivot rod 36 forces the capture plates to translate inward along the slide rod 22 until they contact the side-walls of the tire. Further rotation results in compression of the springs 44 in the compression rods 36 and extension of the bolts 35 through the bearing 43. Inward translation of the capture plates and compression of the springs on the compression rods are shown in this detail.

Final capture is accomplished when the motorcycle tire contacts an upper engagement shoe 46 mounted at terminal tube 14. Shoe 46 is constructed of a single piece of metal plate bent in such a manner as to have a wedge shaped capture profile for a tire entering it. The plate is mounted with the flat portions in the vertical position and the sides of this shoe set at an angle of approximately 30 degrees to the longitudinal direction of the stand. This shoe shall be of sufficient size to allow capture of wide tires and small tires.

Use of this stand is accomplished by riding or pushing the motorcycle in the stand. Removal is accomplished by pulling or riding the motorcycle out.

While I have described the invention with respect to a single embodiment, it is to be understood that it is not so limited and any device is intended that the invention be determined in accordance with the full scope of the appended claims.

What I claim is:

1. Apparatus for supporting a motorcycle by engaging a wheel thereof, comprising:
   a. means for providing lateral support;
   b. means pivotally mounted to said providing means for resiliently engaging the wheel on each side thereof; wherein said resiliently engaging means comprises:
      i. a contact plate pivotally mounted to said providing means for movement about an axis transverse to the wheel;
      ii. opposing capture plates mounted to said contact plate for concomitant pivotal movement; and
      iii. means for biasing said opposing capture plates toward each other; and
   c. a pair of laterally extending rods mounted to said contact plate parallel to said axis and extending through a set of aligned apertures in said capture plates such that said plates are free to move axially along said pair of rods.

2. Apparatus for supporting a motorcycle by engaging a wheel thereof, comprising:
   a. means for providing lateral support; and
   b. means pivotally mounted to said providing means for resiliently engaging the wheel on each side thereof; wherein said resiliently engaging means comprises:
      i. a contact plate pivotally mounted to said providing means for movement about an axis transverse to the wheel;
      ii. opposing capture plates mounted to said contact plate for concomitant pivotal movement; and
      iii. means for biasing said opposing capture plates toward each other, wherein said means for biasing comprises a pivot rod pivotally affixed at one end to an outer side of a capture plate and slidably affixed at an opposite end to said means for providing lateral support, and a spring cooperatively positioned to urge said capture plate against the wheel.

3. Apparatus for supporting a motorcycle by engaging a wheel thereof, comprising:
   a. means for providing lateral support;
   b. shoe means mounted to said providing means for wedging engagement with the wheel; and
   c. means pivotally mounted to said providing means for resiliently engaging the wheel on each side thereof, wherein said resiliently engaging means comprises:
      i. a contact plate pivotally mounted to said providing means for movement about an axis transverse to the wheel;
      ii. opposing capture plates mounted to said contact plate for concomitant pivotal movement; and
      iii. means for biasing said opposing capture plates toward each other, wherein said means for biasing comprises a pivot rod pivotally affixed at one end to an outer side of a capture plate and slidably affixed at an opposite end to said means for providing lateral support, and a spring cooperatively positioned to urge said capture plate against the wheel.

4. Apparatus as defined in claim 3 wherein said means for providing lateral support comprises a horizontal portion extending longitudinally perpendicular to said axis of rotation and an upright portion, wherein said means for resiliently engaging is mounted to said horizontal portion and said shoe means is mounted to said upright portion.

5. Apparatus as defined in claim 4 wherein said shoe means comprises an outwardly flaring channel member opening horizontally in the direction of said horizontal portion of said means for providing lateral support.

6. Apparatus as defined in claim 3 wherein said contact plate is curved to receive said motorcycle wheel.

7. Apparatus as defined in claim 3 wherein said contact plate is planar.

8. Apparatus for supporting a motorcycle by engaging a wheel thereof, comprising:
 a. means for providing lateral support;
 b. shoe means mounted to said providing means for wedging engagement with the wheel;
 c. means pivotally mounted to said providing means for resiliently engaging the wheel on each side thereof; wherein said resiliently engaging means comprises:
  i. a contact plate pivotally mounted to said providing means for movement about an axis transverse to the wheel;
  ii. opposing capture plates mounted to said contact plate for concomitant pivotal movement; and
  iii. means for biasing said opposing capture plates toward each other; and
 d. a pair of laterally extending rods mounted to said contact plate parallel to said axis and extending through a set of aligned apertures in said capture plates such that said plates are free to move axially along said pair of rods.

9. Apparatus as defined in claim 8 wherein said means for biasing comprises a pair of pivot rods wherein each pivot rod is pivotally affixed at one end to an outer side of a capture plate and slidably affixed at an opposite end to said means for providing lateral support, and a pair of springs cooperatively positioned to urge said capture plates against the wheel.

10. Apparatus as defined in claim 9 wherein said capture plates have an arcuate profile.

11. Apparatus as defined in claim 9 wherein said pivot rod has a spherical bearing mounted in a first end connected to said capture plate and passes through a spherical bearing mounted to said means for providing lateral support at a second end.

12. Apparatus for supporting a motorcycle by engaging a wheel thereof comprising:
 a. means for providing lateral support;
 b. capture means pivotally mounted to said providing means for resiliently engaging sides of the wheel at a lowermost portion thereof, wherein said capture means comprises:
  i. a contact member pivotally mounted for movement about an axis transverse to the wheel;
  ii. opposing capture plates mounted to said contact member for concomitant pivotal movement; and
  iii. means for biasing said opposing capture plates toward each other, wherein said biasing means comprises a pivot rod pivotally affixed at one end to an outer side of a capture plate and slidably affixed at an opposite end to said providing means, and a spring cooperatively positioned to urge said capture plate against the wheel; and
 c. means mounted to said providing means for arresting the forward movement of the wheel at a predetermined point relative to said capture means.

13. Apparatus for supporting a motorcycle by engaging a wheel thereof comprising:
 a. means for providing lateral support;
 b. capture means pivotally mounted to said providing means for resiliently engaging sides of the wheel at a lowermost portion thereof, wherein said capture means comprises:
  i. a contact member pivotally mounted for movement about an axis transverse to the wheel;
  ii. opposing capture plates mounted to said contact member for concomitant pivotal movement; and
  iii. means for biasing said opposing capture plates toward each other;
 c. means mounted to said providing means for arresting the forward movement of the wheel at a predetermined point relative to said capture means; and
 d. a pair of laterally extending rods mounted to said contact member parallel to said axis and extending through a set of aligned apertures in said capture plates such that said plates are free to move axially along said pair of rods.

14. Apparatus as defined in claim 13 further comprising a base having a horizontal portion extending longitudinally perpendicular to said axis of rotation and an upright portion, wherein said means for resiliently engaging is mounted to said horizontal portion and said arresting means is mounted to said upright portion.

15. Apparatus as defined in claim 14 wherein said arresting means comprises an outwardly flaring channel member opening horizontally in the direction of said horizontal portion of said base.

16. Apparatus as defined in claim 13 wherein said means for biasing comprises a pivot rod pivotally affixed at one end to an outer side of a capture plate and slidably affixed at an opposite end to said providing means, and a spring cooperatively positioned to urge said capture plate against the wheel.

* * * * *